US006737833B2

(12) United States Patent
Kalman et al.

(10) Patent No.: US 6,737,833 B2
(45) Date of Patent: May 18, 2004

(54) VOLTAGE CONTROL OF AN HR-PMG WITHOUT A ROTOR POSITION SENSOR

(75) Inventors: Gabor Kalman, Palos Verdes, CA (US); Colin Huggett, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 69 days.

(21) Appl. No.: 10/210,395

(22) Filed: Jul. 31, 2002

(65) Prior Publication Data

US 2004/0021447 A1 Feb. 5, 2004

(51) Int. Cl.[7] ............................................... H02P 9/14
(52) U.S. Cl. ............................. 322/20; 322/46; 322/24; 322/59; 363/15; 318/700
(58) Field of Search ......................... 322/19, 20, 24, 322/46, 59; 290/40 C; 363/95, 15; 318/700, 807

(56) References Cited

U.S. PATENT DOCUMENTS

| 5,255,175 | A |   | 10/1993 | Uchino ........................ 363/81 |
| 5,585,709 | A |   | 12/1996 | Jansen et al. ............... 318/807 |
| 5,648,705 | A |   | 7/1997  | Sitar et al. .................. 318/145 |
| 5,652,485 | A | * | 7/1997  | Spiegel et al. .............. 318/147 |
| 5,751,069 | A |   | 5/1998  | Rajashekara et al. ....... 318/145 |
| 5,793,167 | A |   | 8/1998  | Liang et al. ................. 318/141 |
| 5,994,867 | A |   | 11/1999 | Birk et al. ................... 318/609 |
| 6,005,364 | A |   | 12/1999 | Acarnley ..................... 318/632 |
| 6,069,808 | A | * | 5/2000  | Panahi et al. ................. 363/98 |
| 6,163,127 | A |   | 12/2000 | Patel et al. .................. 318/700 |
| 6,163,128 | A |   | 12/2000 | Hiti et al. .................... 318/722 |
| 6,208,120 | B1 | * | 3/2001 | Gibbs ........................... 322/59 |
| 6,301,136 | B1 |   | 10/2001 | Huggett et al. ............... 363/95 |
| 6,384,567 | B1 | * | 5/2002 | Maeda ........................ 318/801 |
| 2002/0074803 | A1 | * | 6/2002 | Kajiura ..................... 290/40 F |
| 2003/0218887 | A1 | * | 11/2003 | Kojori et al. ................. 363/16 |

* cited by examiner

*Primary Examiner*—Nicholas Ponomarenko
(74) *Attorney, Agent, or Firm*—Oval Coglar, Esq.

(57) ABSTRACT

An electrical power system includes an electric power source, for example, an electrical machine, capable of supplying AC power to a load; a power converter connected to the electric power source; a position estimator for receiving a current feedback signal in Park vector format and providing a synchronous reference frame without the need, for example, of a rotor position sensor in the electrical machine; and a controller configured to provide a voltage command for controlling the power converter, the controller receiving the current feedback signal and a current reference in Park vector format and using the synchronous reference frame, the current feedback signal, and the current reference to produce the voltage command.

24 Claims, 3 Drawing Sheets

VOLTAGE CONTROL OF AN HR-PMG WITHOUT A ROTOR POSITION SENSOR

BACKGROUND OF THE INVENTION

The present invention generally relates to power quality regulation in electric power generation systems and, more particularly, to voltage control of a high reactance permanent magnet generator without a rotor position sensor in an electrical power generation system of the type used on aircraft.

An electrical power generation system representative of the type used on aircraft may generate electricity in the form of 3-phase power at an approximate frequency of 1000 Hertz (Hz), selected to optimize the weight and volume of the system, and an open circuit voltage of approximately 163 Volts alternating current (VAC), peak (pk). Power from such an aircraft electrical power generation system may be supplied, for example, from the alternating current (AC) power output of a generator providing 3-phase alternating current at 1000 Hertz and 163 VAC (pk), which may be passed through a solid state power converter, also commonly referred to as an inverter, and rectified, i.e. converted to direct current (DC), to provide a 270 Volt direct current (VDC) power source. The electrical power generation system may be used to power various subsystems and components, for example, electric motors, which can inject noise or power fluctuations into the electrical power generation system. For certain applications it is desirable to protect the generator from short circuit conditions, which may arise within the electric power generation system or the load connected to it. One approach for protecting the generator from short circuits is to design the generator with high reactance windings, i.e., windings that possess sufficient inductance such that the short-circuit current is limited to a value approximately equal to its rated value. A permanent magnet generator with high reactance windings is referred to as a high reactance, permanent magnet generator (HR-PMG).

The power quality of the DC voltage at the interface of the inverter with the electrical power generation system may be subject to certain requirements and constraints. For military aircraft, for example, the power quality of the DC voltage at the interface of the inverter with the electrical power generation system is typically specified by a military standard such as Mil-Std 704. Electrical generation systems on aircraft are also subject to requirements limiting the amount of electromagnetic radiation conducted emissions of the system, which may interfere with other electronics systems on the aircraft, and is referred to as electromagnetic interference (EMI). To meet EMI requirements, which are stringent for military aircraft in particular, electrical generation systems contain LC-type filters comprised of inductances and capacitances to filter out fluctuations, such as harmonics, in the current and voltage. For example, the electrical power generation system described above may require an EMI filter at the output of the inverter or may at least contain a capacitor bank at the output of the inverter. The LC filter circuits are prone, however, to harmonic resonance, i.e., such circuits may resonate at certain frequencies. For example, an electric motor powered by the electric power generation system may inject some amount of current harmonics into the generation system, despite interfacing with its feeder through appropriate EMI filters. The amplitude of the resonant currents circulating throughout the electrical power generation system may become so large as to create unacceptable voltage fluctuation, or ripple, at the output of the inverter. Such large voltage ripples are unacceptable because they interfere with voltage control of the electric power generation system, and may even interfere with voltage control to the extent of creating limit-cycle conditions, and because they exceed allowable power quality limits.

For these reasons, electric power generation systems generally include some means for regulating voltage and current levels to reduce power fluctuations to an acceptable level and maintain a substantially constant and dependable source of power. One means for regulating power is the use of a voltage controller, which may provide voltage commands to the inverter for adjusting its power output to compensate for the conditions causing the power fluctuations. The voltage commands are based on input from the DC portion of the power system and from the generator, for example, it may be necessary to know the position of the generator's rotor. A rotor position sensor may be provided to supply an electrical signal indicating the generator rotor position to the voltage controller. The voltage controller can use the rotor position information along with other system information to provide gating signals to the inverter.

Rotor position sensors, which may be electro-magnetic devices, such as Hall effect sensors, or electro-optical devices, for example, are usually sensitive to, or intolerant of, the hostile operating environment provided by an HR-PMG or other type of generator. Many rotor position sensors, and in particular electro-optical sensors, are sensitive to dust, which is typically present in the generator environment. Electronic rotor position sensors, and other types of sensors, may be intolerant of the temperatures typically present in the generator environment. A high reactance, permanent magnet generator may operate at temperatures in the range of 150–180° C., whereas electronic rotor position sensors are typically not tolerant of operating temperatures in excess of approximately 125° C. Provision of rotor position sensors thus requires modification and compromise of the design of the generator, which can be expensive and still not provide rotor position sensing having satisfactory dependability. Thus, it is desirable to eliminate the rotor position sensor used by prior art voltage controllers, but the rotor position input is necessary for satisfactory voltage control of the HR-PMG.

As can be seen, there is a need for voltage control of a generator without a rotor position sensor in electrical power generation systems. There is also a need for voltage control of a high reactance permanent magnet generator without a rotor position sensor in electrical power generation systems of the type used on aircraft.

SUMMARY OF THE INVENTION

The present invention provides voltage control of a generator without a rotor position sensor in electrical power generation systems. In particular, the present invention provides voltage control of a high reactance permanent magnet generator without a rotor position sensor in electrical power generation systems of the type used on aircraft.

In one aspect of the present invention, an electrical power system includes an electric power source, for example, an electrical machine, capable of supplying AC power; a power converter connected between the power source and the distribution system; a rotor position estimator for the power source suitable for estimating the position of the rotor of the electrical power generator in a stationary reference frame; and a controller configured to provide commands to the gating logic of the inverter for controlling the power converter, the controller receiving a reference frame from the position estimator, DC link voltage from the output of the inverter, and power source phase current sensed information for the power source, from which the gating information for the inverter is computed.

In another aspect of the present invention, an electrical power system includes an electric power source comprising a high reactance generator adapted for providing AC power to a load; a power converter connected to the electric power source; two or more current sensors disposed for sensing an AC current between the electric power source and the power converter so that the current sensors can provide a current feedback signal; a position estimator for receiving the current feedback signal in Park vector format and providing a synchronous reference frame; a controller, which provides a voltage command for controlling the power converter, where the controller receives the current feedback signal and a current reference in Park vector format and uses the synchronous reference frame, the current feedback signal, and the current reference to produce the voltage command; and a modulation module, which receives the voltage command and provides control signals to the power converter.

The position estimator includes a multiplier which multiplies the current feedback signal in Park vector format by a rotator vector defined by unity amplitude and angle $\theta$ in Park vector format; a PI-regulator which operates on the imaginary portion of this product to provide an estimated electrical frequency; and an integrator which integrates the estimated electrical frequency to provide the negative estimate of the transformation angle $\theta$ to the multiplier and to provide the transformation angle $\theta$, which is sufficient to determine the synchronous reference frame, to the controller.

In yet another aspect of the present invention, an electrical power system includes an electric power source comprising a high reactance permanent magnet generator adapted for providing AC power to a load at varying power factors; a power converter connected to the electric power source; two or more current sensors disposed for sensing an AC current between the electric power source and the power converter so that the current sensors can provide a current feedback signal; a position estimator for receiving the current feedback signal in Park vector format and providing a synchronous reference frame; a DC link voltage sensor for sensing a DC link voltage output of the power converter and providing a DC link voltage feed back signal; a first comparator receiving the DC link voltage feed back signal and a DC link voltage command signal, and producing a DC link voltage error signal; a PI-regulator for regulating the DC link voltage error signal to produce a DC link voltage angle component, where the DC link voltage angle component is a portion of the angle component of a current reference having an angle component and an amplitude component and whereby the electrical power system can control the DC link voltage output of the power converter; a current sensor disposed for sensing a DC current output of the power converter and providing a load current signal; a feedforward function module which receives the load current signal and produces a feedforward angle component; a combiner which combines the DC link voltage angle component and the feedforward angle component so that the angle component of the current reference includes the feedforward angle component so that gain sensitivity of the angle component of the current reference is minimized; a non-linear function generator configured to receive the load current signal and produce the amplitude component of the current reference, so that the controller can control the DC current output of the power converter; a controller, which provides a voltage command for controlling the power converter, where the controller receives the current feedback signal and a current reference in Park vector format and uses the synchronous reference frame, the current feedback signal, and the current reference to produce the voltage command; and a space vector modulation module, which receives the voltage command and provides control signals to the power converter.

The position estimator includes a multiplier which multiplies the current feedback signal in Park vector format by a negative estimate of a transformation angle $\theta$ in Park vector format to provide a synchronous frame signal; a PI-regulator which regulates the imaginary portion of the synchronous frame signal to provide an estimated electrical frequency; and an integrator which integrates the estimated electrical frequency to provide the negative estimate of the transformation angle $\theta$ to the multiplier and to provide the transformation angle $\theta$, which is sufficient to determine the synchronous reference frame, to the controller.

The controller includes a first conversion block for providing the current feedback signal in Park vector format in the synchronous reference frame; a second conversion block for providing the current reference in Park vector format in the synchronous reference frame; a comparator which subtracts the current feedback signal from the current reference in the synchronous reference frame, to provide a signal operated upon by the PI-regulator producing the voltage command.

In a further aspect of the present invention, a method for electrical power generation includes the steps of: supplying electric power from an electric power source, which includes a high reactance generator, and in which the electric power source is connected to a power converter; sensing an AC current between the electric power source and the power converter using two or more current sensors to provide a current feedback signal; using the current feedback signal in Park vector format to provide a synchronous reference frame; and controlling the power converter by using the synchronous reference frame, the current feedback signal, and a current reference to produce a voltage command and feeding the voltage command through a modulation module to provide control signals to the power converter.

The step of using the current feedback signal in Park vector format to provide a synchronous reference frame includes performing steps of: receiving the current feedback signal in. Park vector format; multiplying the current feedback signal in Park vector format by a negative estimate of a transformation angle $\theta$ in Park vector format to provide a synchronous frame signal; regulating the imaginary component of the synchronous frame signal with a PI-regulator to provide an estimated electrical frequency; and integrating the estimated electrical frequency to provide the negative estimate of the transformation angle $\theta$ in the above step of multiplying and to provide the transformation angle $\theta$, which provides the synchronous reference frame.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides, in electrical power generation systems, voltage control of a generator without a rotor position sensor. In particular, one embodiment of the present invention provides voltage control of a high reactance permanent magnet generator (HR-PMG) without a rotor position sensor in electrical power generation systems of the type used on aircraft. Prior art voltage controllers for a low reactance generator with a rotor position sensor maintain a single power factor at the terminals of the converter on the alternating current (AC) side of the converter. Power factor is the ratio of true power to apparent power in an AC circuit, where true power is the actual power consumed, distinguished from apparent power, which is the product of RMS (root-mean-squared) current times RMS line voltage multiplied by the number of phases. An example of a voltage controller that operates at a single power factor is disclosed in U.S. Pat. No. 6,301,136, entitled "Floating Frame Controller", issued on Oct. 9, 2001, and assigned to the assignee of the present invention. The disclosure in that patent is hereby incorporated by reference into the present application.

Maintaining a single power factor at the AC side of the inverter is acceptable for low impedance power sources, however the requirement to provide short circuit current to enable co-ordination of protective devices requires increased complexity in the inverter both with respect to inverter topology and control complexity. Because of the characteristics of the high reactance permanent magnet machine, i.e. the HR-PMG, and the desire to minimize the KVA rating of the inverter (where KVA is the product of the RMS current and voltage, measured in kilo-Volt-Amperes) the machine/inverter is designed such that the short circuit current and the rated current are essentially the same. In order to extract varying quantities of power from the DC link, and still maintain constant voltage at the DC link, the generator power factor at terminals of the machine/inverter must be regulated continuously. Because of the design constraints, including the open circuit voltage and the short circuit current, that are imposed by the system design and the HR-PMG, regulated DC power can only be produced at the DC link by operating the machine/inverter at a varying power factor. The system can be applied to both a sensor-less and sensor type control system, the control strategy is similar in both applications.

Figure 1:
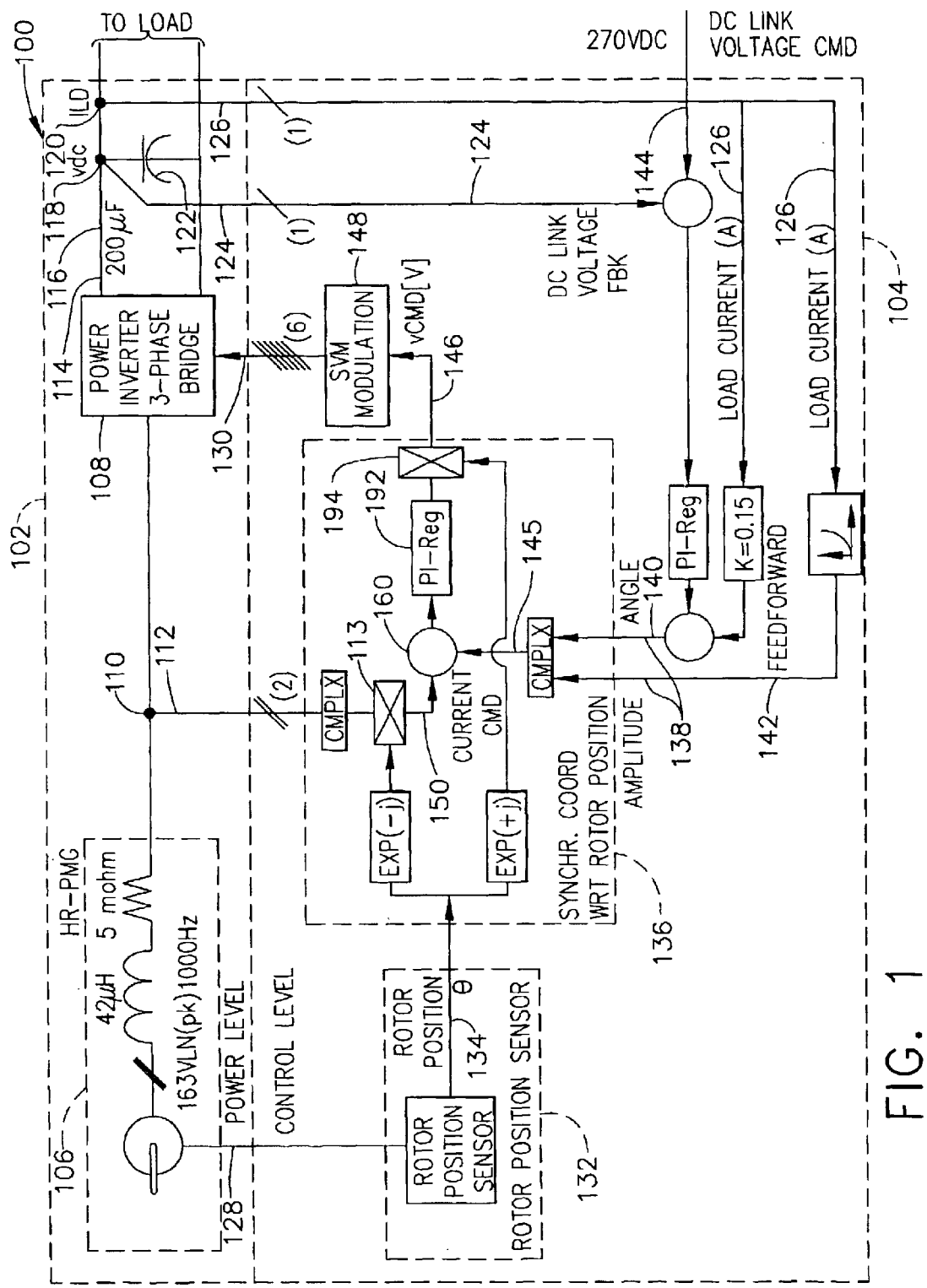
FIG. 1 is a block diagram of an electrical power generation system, employing voltage control of a high reactance permanent magnet generator, which conceptually illustrates the connection and function of a rotor position sensor that is eliminated according to one embodiment of the present invention.

Referring now to FIG. 1, electrical power generation system 100 is illustrated. Electrical power generation system 100 illustrates the connection and function of a rotor position sensor that is eliminated, according to one embodiment, for voltage control of a high reactance permanent magnet generator. FIG. 1 shows that electrical power generation system 100 may be conceptually divided into a power level 102 and a control level 104.

Power level 102 includes an electric power source, for example, HR-PMG 106. HR-PMG 106 may be connected to, and supply AC power to power converter 108. Current sensors 110 are disposed for sensing an AC current between the electric power source, HR-PMG 106, and power converter 108, and may provide current feedback signal 112 to control level 104. By using at least two current sensors on a three phase line connection between HR-PMG 106 and power converter 108, a sufficient number of scalar quantities can be sensed, or measured, to enable current feedback signal 112 to be calculated as a vector, and in particular, as a Park vector, as described below in connection with FIG. 2.

The output of power converter 108 is DC link voltage output 114. In the present example used to illustrate one embodiment, DC link voltage output 114 may be 270 VDC and may be supplied to a 270 VDC bus connected to a load or loads, for example, the engine starting motors or other electrical systems on an aircraft. Power converter 108 may also supply DC current output 116 to the same 270 VDC bus connected to a load or loads. DC link voltage sensor 118 may be used to measure the voltage of DC link voltage output 114, and DC current sensor 120 may be used to measure the DC current output 116 to load. The voltage of DC link voltage output 114 appears across DC link capacitor 122, which, for example, may have a value of 200 microfarads ($\mu$F), as indicated in FIG. 1. DC link capacitor 122 provides an essentially zero source impedance as is required by the inverter, and also acts as a major component of the electromagnetic interference (EMI) filter that is required to control conducted emissions onto the 270 VDC bus. DC link voltage sensor 118 may provide DC link voltage feedback signal 124 to control level 104. DC current sensor 120 may provide load current signal 126 to control level 104. Rotor position signal 128 may also be provided to control level 104. The various signals, such as DC link voltage feedback signal 124, load current signal 126, rotor position signal 128, and current feedback signal 112, may be used by the control level 104 portion of electrical power generation system 100 to produce control signals 130 for controlling power converter 108 so that, for example, DC link voltage output 114 may be regulated, and the AC power supplied to power converter 108 by HR-PMG 106 and the power factor may be regulated.

Control level 104 may include, for purposes of conceptually illustrating the connection and function of a rotor position sensor that is eliminated according to one embodiment, rotor position module 132. Rotor position module 132 may receive rotor position signal 128 and output rotor position direction vector signal 134 for establishing a reference frame synchronous with respect to the moving rotor of HR-PMG 106, i.e., a coordinate system for representing vector quantities associated with HR-PMG 106, such as the electrical currents in the, stator, or armature windings of HR-PMG 106 or the varying magnetic fluxes produced in HR-PMG 106, where the coordinate system rotates at the same speed and in synchronization with the moving rotor of HR-PMG 106. A reference frame synchronous with respect to the moving rotor of a generator or other electrical machine is referred to as a synchronous reference frame.

Control level 104 may also include a controller 136. Controller 136 may receive a current reference 138 comprising an angle component 140 and an amplitude component 142. This command, current reference 138, is generated in the synchronous reference frame, and is compared to current vector that has been transformed to the same reference frame by multiplying the stationary reference frame current vector (DC current output 116 constructed from current feedback signal 112) by $\exp(-j*\theta)$ where $\theta$ is the angle developed from the rotor position sensor. Current reference 138 is converted from polar co-ordinates (magnitude angle) to direct quadrature (DQ) Cartesian co-ordinates 139, resulting in a vector current command 145 in the synchronous reference frame. As shown in FIG. 1, controller 136 may process current feedback signal 112, converting it to the synchronous reference frame 113, comparing it, using comparison operator 160, to the reference vector current command 145, and operating upon the error signal 150 by the proportional integral controller 192, and converting the output of the regulator back to the stationary reference frame by multiplying the signal by $\exp(+j*\theta)$ at $\exp(+j*\theta)$ block 194.

Figure 2:
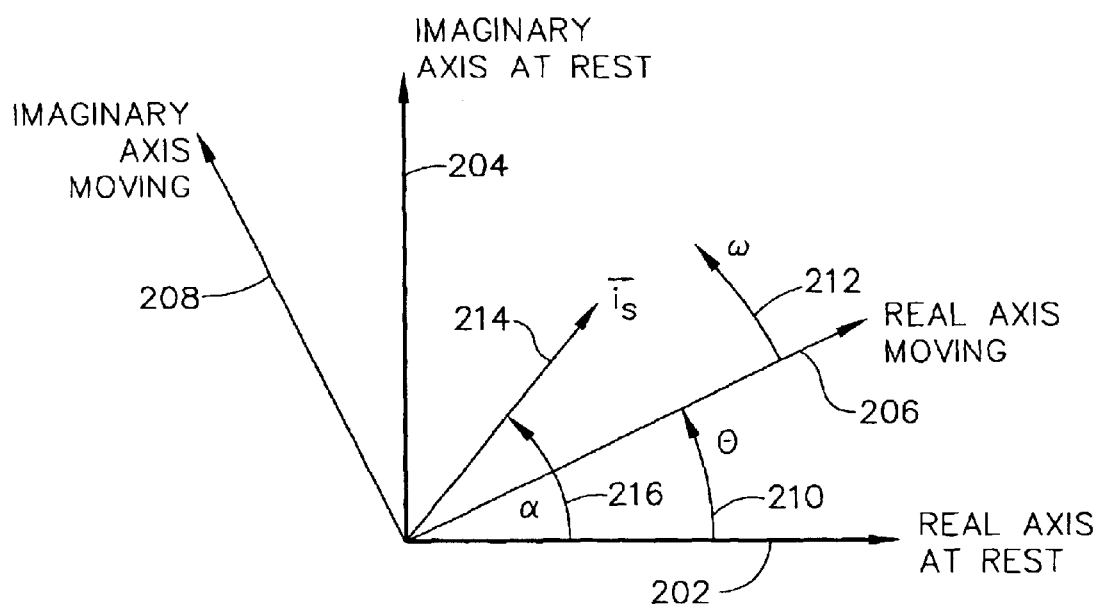
FIG. 2 is an illustration of a Park vector representation of a stator current vector and transformation of the Park vector representation between stationary and moving reference frames.

Referring now to FIG. 2, a Park vector representation of electrical current in the stator windings of HR-PMG 106, i.e., a stator current vector, is shown as an example to illustrate the transformation of the Park vector representation of the stator current vector between stationary and moving, or synchronous, reference frames. Although the stator current vector is used to illustrate the present example, any measurable vector quantity associated with HR-PMG 106, or any other suitable electrical machine, could be used, such as winding voltages or magnetic fluxes, for example. An introduction to the concept of Park vectors in connection with electrical machines is given by P. K. Kovacs in "Transient Phenomena in Electrical Machines," Elsevier Science Publishing Co. (1984). A voltage controller using Park vectors for eliminating the rotor position sensor is disclosed in U.S. Pat. No. 6,301,136, referenced above.

FIG. 2 shows a stationary reference frame, i.e., a reference frame that is fixed (or at rest) in space relative to the electrical machine, HR-PMG 106 in the present example. The stationary reference frame comprises real axis at rest 202 and imaginary axis at rest 204. FIG. 2 also shows a moving reference frame, which may be a synchronous reference frame, comprising real axis moving 206 and imaginary axis moving 208. As seen in FIG. 2, the moving reference frame is rotated from the stationary reference frame by transformation angle $\theta$ 210. Also as seen in FIG. 2, the moving reference frame is rotating with respect to the stationary reference frame at an angular speed $\omega$ 212. Thus, if angular speed $\omega$ 212 is known, transformation angle $\theta$ 210 can be calculated from angular speed $\omega$ 212 using the equation:

$$\theta = \theta^0 + \int \vec{\omega}\, dt \qquad (1)$$

where $\theta_0$ is the initial position of the moving reference frame at time t=0. In other words, transformation angle $\theta$ can be approximated, or estimated, by integrating an estimated angular speed of the moving reference frame. In the case of a synchronous reference frame, the estimated angular speed of the synchronous reference frame is the estimated angular speed of the rotor of the electrical machine, in the present example, the rotor of HR-PMG 106.

In the present example, Park vector $\vec{i}_S$ 214 represents the stator winding current as a vector in space, and may be referred to as the space vector of the winding current. As seen in FIG. 2, the position of Park vector $\vec{i}_S$ 214 can be given in, i.e., given relative to, either the stationary or the moving reference frame. Using a three phase electrical machine, such as HR-PMG 106, as in the present example, Park vector $\vec{i}_S$ 214 can be determined from the three stator winding current scalar quantities $i_a$, $i_b$, and $i_c$, which are the electric currents in each of the three individual stator windings of the three phase electric machine. Measurement of the scalar quantities $i_a$, $i_b$, and $i_c$ can be obtained, for example, using appropriate sensors or measuring devices as known in the art. For a three phase electrical machine, Park vector $\vec{i}_S$ 214 is defined as:

$$\vec{i}_s = \frac{2}{3}(i_a + \vec{a}i_b + \vec{a}^2 i_c) \qquad (2)$$

where $\vec{a}$ is the spatial relationship of the stator windings within the machine. For a three-phase machine, as in the present example, $\vec{a}$ is the complex number $$\vec{a} = -\frac{1}{2} + j\sqrt{\frac{3}{2}} = e^{j\frac{2\pi}{3}}$$

viewed as a vector in the complex plane and $\vec{a}^2$ is the complex number $$\vec{a}^2 = -\frac{1}{2} - j\sqrt{\frac{3}{2}} = e^{-j\frac{2\pi}{3}}$$

viewed as a vector in the complex plane.

As seen in FIG. 2, angle $\alpha$ 216 describes the position of Park vector $\vec{i}_S$ 214 relative to the stationary reference frame comprising real axis at rest 202 and imaginary axis at rest 204. Thus, Park vector $\vec{i}_S$ 214 can be represented in the stationary reference frame using polar coordinates as:

$$\vec{i}_s = i_s e^{j\alpha} \qquad (3)$$

where $i_s$ is the amplitude, or length, of Park vector $\vec{i}_S$ 214. As seen in FIG. 2, angle $\alpha$ 216 minus transformation angle $\theta$ 210 describes the position of Park vector $\vec{i}^s$ 214 relative to the moving reference frame, which may be a synchronous reference frame, comprising real axis moving 206 and imaginary axis moving 208. Thus, Park vector $\vec{i}^s$ 214 can be represented in the moving, or rotating, reference frame using polar coordinates as:

$$\vec{i}^{s_r} = i_s e^{j(\alpha - \theta)} = \vec{i}_s e^{-j\theta} \qquad (4)$$

where, again, $i_s$ is the amplitude, or length, of Park vector $\vec{i}_S$ 214, which is Park vector $\vec{i}_s^r$ in the rotating, i.e., moving, or synchronous reference frame. The second equality in equation (4) shows that transformation of Park vector coordinates from a stationary frame to a synchronous (rotating) frame is effected by multiplying the stationary frame Park vector by the complex number $e^{-j\theta}$ i.e. rotating the stationary frame Park vector through the negative of the angle $\theta$, to obtain the synchronous frame Park vector. The complex number $e^{-j}$ may also be written as $\exp(-j*\theta)$.

For the purposes of determining rotor position without a rotor position sensor, not only the three stator winding current scalar quantities $i_a$, $i_b$, and $i_c$ of the present example, but any electrical signal of the generator, or electrical machine, can be used as a synchronous reference frame so long as the Park vector of the filtered or unfiltered signal—in a stationary reference frame—rotates at the rotor speed.

Figure 3:
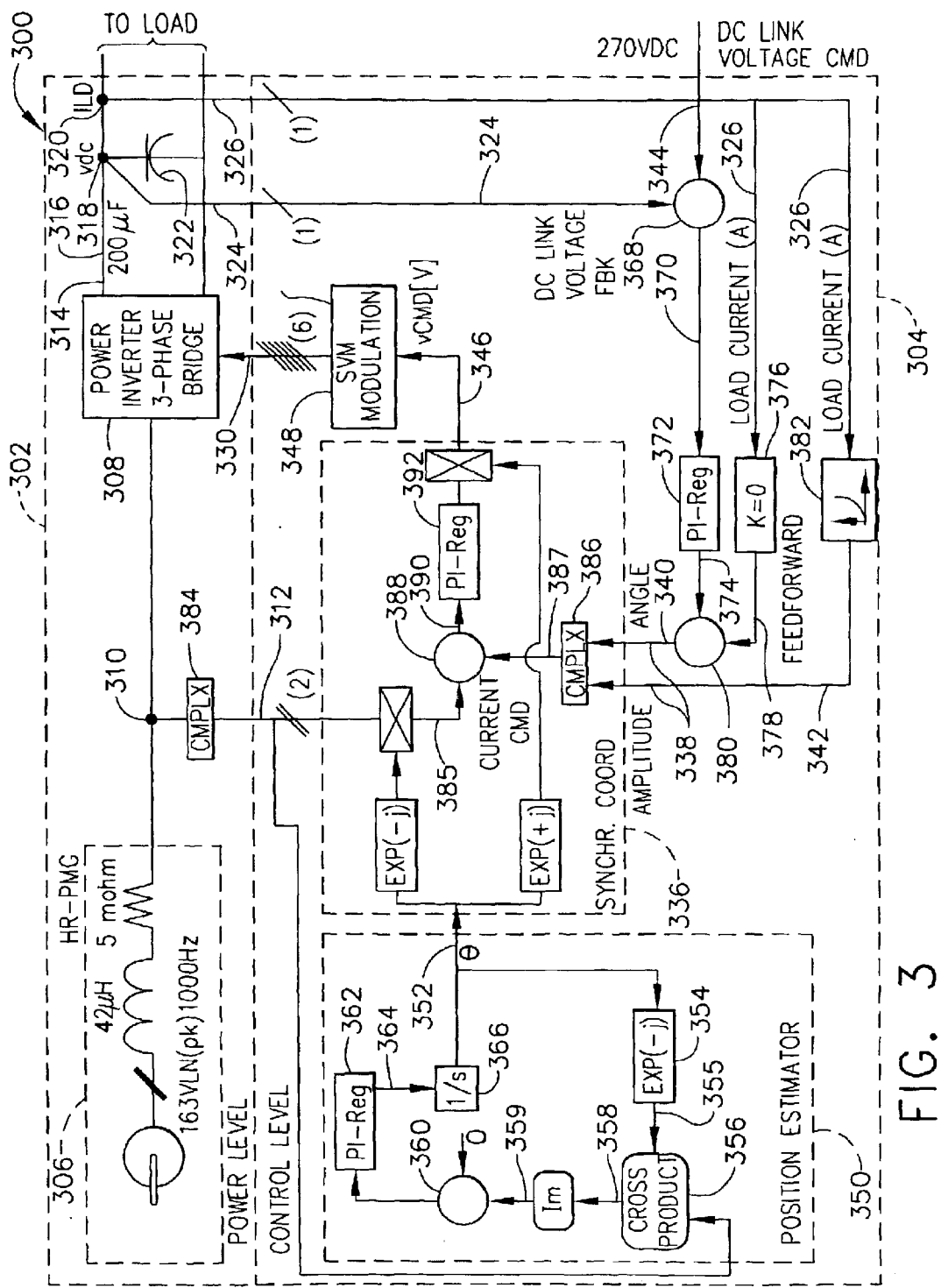
FIG. 3 is a block diagram of an electrical power generation system employing voltage control of a high reactance permanent magnet generator without a rotor position sensor, according to one embodiment of the present invention.

Referring now to FIG. 3, electrical power generation system 300 is illustrated, employing voltage control of a high reactance permanent magnet generator without a rotor position sensor, according to one embodiment. Certain features and components corresponding to features and components of electrical power generation system 100, shown in FIG. 1, are numbered in a manner corresponding to the numbering of FIG. 1. Thus, FIG. 3 shows electrical power generation system 300 corresponding to electrical power generation system 100; power level 302 corresponding to power level 102; control level 304 corresponding to control level 104 shown in FIG. 1, and so on, with the exception that rotor position signal 128, rotor position module 132, and rotor position direction vector signal 134 have been eliminated.

FIG. 3 shows that electrical power generation system 300 may be conceptually divided into a power level 302 and a control level 304. Power level 302 includes an electric power source, for example, HR-PMG 306. HR-PMG 306 may be connected to, and supply AC power to power converter 308. Current sensors 310 may be disposed for sensing AC current between the electric power source, HR-PMG 306, and power converter 308, and may provide current feedback signal 312 to control level 304. By using at least two current sensors on a polyphase line, such as the three phase line connection between HR-PMG 306 and power converter 308, a sufficient number of scalar quantities can be sensed, or measured, to, enable the current in the machine/inverter to be represented as a vector quantity, and in particular, to enable current feedback signal 312 to be calculated as a Park vector.

Power converter 308 may supply DC link voltage output 314. In the present example used to illustrate one embodiment, DC link voltage output 314 may be 270 VDC and may be supplied to a 270 VDC bus connected to a load or loads, for example, the engine starting motors or other electrical systems on an aircraft. Power converter 308 may also supply DC current output 316 to the same 270 VDC bus connected to a load or loads. DC link voltage sensor 318 may be used to measure the voltage of DC link voltage output 314, and DC current sensor 320 may be used to measure the DC current output 316 to load. The voltage of DC link voltage output 314 may appear across DC link capacitor 322, which, for example, may have a value of 200 microfarads ($\mu F$), as indicated in FIG. 3. DC link capacitor 322 may provide isolation of DC link voltage output 314 and DC current output 316 from noise, such as that caused by EMI and harmonic resonance. DC link voltage sensor 318 may provide DC link voltage feedback signal 324 to control level 304. DC current sensor 320 may provide load current signal 326 to control level 304. The various signals, such as DC link voltage feedback signal 324, load current signal 326, and current feedback signal 312, may be used by control level 304 of electrical power generation system 300 to produce control signals 330 for controlling power converter 308 so that, for example, DC link voltage output 314 may be regulated, DC current output 316 may be regulated, and the AC power supplied to power converter 308 by HR-PMG 306 and the power factor may be controlled and regulated.

Control level 304 may include position estimator 350 for establishing and providing a synchronous reference frame with respect to the moving rotor of HR-PMG 306. Position estimator 350 may provide a synchronous reference frame by providing transformation angle θ 352 for performing the multiplication by the complex number exp(-j*θ), which provides the transformation between stationary and synchronous reference frames, or the complex number exp(+j*θ), which provides the reverse transformation between synchronous and stationary reference frames. For example, transformation angle θ 352 may be fed to exp(-j) block 354, the output of which may be supplied to vector cross product multiplier 356 in the form of complex number exp(-j*θ) 355. (Complex number exp(-j*θ) 355 is also referred to as negative estimate of transformation angle θ") Multiplier 356 multiplies the complex number exp(-j*θ) 355, by current feedback signal 312 in Park vector format. The imaginary component 359 of the resulting complex number 358, also referred to as "synchronous frame signal", is then compared to zero by comparison operator 360, and the result operated upon by PI regulator 362. The output of PI regulator 362 is the estimated electrical frequency 364 of the current vector, i.e., current feedback signal 312. Integration, by integrator 366, of estimated electrical frequency 364 yields the vector transformation angle θ 352 that is fed back to multiplier 356 through exp(-j) block 354. By tracking the current vector of HR-PMG 306, position estimator 350 may provide a synchronous reference frame, via transformation angle θ 352, to controller 336.

Controller 336 forms part of a current control loop required for voltage regulation in electrical power generation system 300. For example, input to conversion block 386 is current reference 338 in polar synchronous co-ordinate system. Thus, current reference 338 may have an angle component 340 and an amplitude component 342. The function of conversion block 386 is to convert polar co-ordinate current reference 338 to current reference 387 in Cartesian co-ordinates. Current reference 387 is now in the synchronous reference frame. For the current control loop to operate, current feedback signal 312 must be transferred to the same co-ordinate system. The current feedback signal 312 may be multiplied by exp(-j*θ) where θ is transformation angle θ 352, and converted to Cartesian co-ordinates by conversion block 384 to produce current feedback 385 in the synchronous reference frame. Current feedback 385 may be compared to current reference 387 by comparator 388 to produce the command 390. Command 390 may be operated upon by PI regulator 392, and then converted back to the stationary reference frame by multiplying by exp(+j*θ), where, again, θ is transformation angle θ 352, to provide voltage command 346.

Current reference 338 may have angle component 340 and amplitude component 342. Current reference 338 may be derived, as seen in FIG. 3, from DC link voltage feedback signal 324, load current signal 326, and DC link voltage command signal 344. For example, comparator 368 may produce DC link voltage error signal 370 as the difference between DC link voltage feedback signal 324 and DC link voltage command signal 344. DC link voltage error signal 370 may be regulated by PI-regulator 372 to produce DC link voltage angle component 374. Feedforward function module 376 may process load current signal 326 to produce feedforward angle component 378. Feedforward angle component 378 may be combined with DC link voltage angle component 374 by combiner 380 to produce angle component 340 of current reference 338. Feedforward angle component 378 may be provided to minimize the gain sensitivity of angle component 340 of current reference 338. Non-linear function generator 382 may process load current signal 326 to produce amplitude component 342 of current reference 338.

Voltage command 346 may be processed by space vector modulation (SVM) module 348 to produce control signals 330 for controlling power converter 308, as described above, for controlling the power factor and regulating the AC power supplied by HR-PMG 306 to power converter 308 and also regulating the DC link voltage output 314 and DC current output 316 of electrical power generation system 300.

It should be understood, of course, that the foregoing relates to preferred embodiments of the invention and that modifications may be made without departing from the spirit and scope of the invention as set forth in the following claims.

We claim:

1. An electrical power generation system comprising:
   an electric power source adapted for providing AC power;
   a power converter connected to said electric power source;
   a position estimator receiving a current feedback signal in Park vector format and providing a synchronous reference frame; and
   a controller configured to provide a voltage command for controlling said power converter, said controller receiving said current feedback signal and a current reference in Park vector format and using said synchronous reference frame, said current feedback signal, and said current reference to produce said voltage command.

2. The electrical power system of claim 1 wherein said power source comprises a high reactance, permanent magnet generator configured such that the short circuit current and the rated current of said high reactance, permanent magnet generator are approximately equal.

3. The electrical power system of claim 1 wherein said position estimator comprises:
   a multiplier configured to multiply said current feedback signal in Park vector format by a negative estimate of a transformation angle $\theta$ in Park vector format to provide a synchronous frame signal,
   a PI-regulator configured to regulate said synchronous frame signal compared to zero to provide an estimated electrical frequency; and
   an integrator configured to integrate said estimated electrical frequency so as to provide said negative estimate of said transformation angle $\theta$ to said multiplier and to provide said transformation angle $\theta$ to said controller, whereby said position estimator provides said synchronous reference frame to said controller.

4. The electrical power system of claim 1 wherein said controller comprises:
   a first conversion block for providing said current feedback signal in Park vector format in said synchronous reference frame;
   a second conversion block for providing said current reference in Park vector format in said synchronous reference frame;
   a comparator using said current feedback signal and said current reference in said synchronous reference frame to provide a command; and
   a PI-regulator regulating said command to produce said voltage command.

5. The electrical power system of claim 1, further comprising a space vector modulation module, said space vector modulation module receiving said voltage command and providing control signals to said power converter.

6. The electrical power system of claim 1, further comprising a plurality of current sensors, said plurality of current sensors disposed for sensing an AC current between said electric power source and said power converter, and for providing said current feedback signal.

7. The electrical power system of claim 1 wherein said current reference comprises an angle component and an amplitude component.

8. The electrical power system of claim 7, further comprising:
   a DC link voltage sensor for sensing a DC link voltage output of said power converter and providing a DC link voltage feed back signal;
   a comparator receiving said DC link voltage feed back signal and a DC link voltage command signal, and producing a DC link voltage error signal; and
   a PI-regulator regulating said DC link voltage error signal to produce a DC link voltage angle component, wherein said angle component of said current reference comprises said DC link voltage angle component and whereby said controller controls said DC link voltage output of said power converter.

9. The electrical power system of claim 8 further comprising:
   a current sensor disposed for sensing a DC current output of said power converter and providing a load current signal;
   a feedforward function module configured to receive said load current signal and produce a feedforward angle component; and
   a combiner configured to combine said DC link voltage angle component and said feedforward angle component so that said angle component of said current reference comprises said feedforward angle component whereby a gain sensitivity of said angle component of said current reference is minimized.

10. The electrical power system of claim 7, further comprising:
    a current sensor disposed for sensing a DC current output of said power converter and providing a load current signal; and
    a non-linear function generator configured to receive said load current signal and produce said amplitude component of said current reference, whereby said controller controls said DC current output of said power converter.

11. An electrical power system comprising:
    an electric power source comprising a high reactance generator adapted for providing AC power;
    a power converter connected to said electric power source;
    a plurality of current sensors, said plurality of current sensors disposed for sensing an AC current between said electric power source and said power converter, and for providing a current feedback signal;
    a position estimator receiving said current feedback signal in Park vector format and providing a synchronous reference frame, wherein said position estimator comprises:
       a multiplier configured to multiply said current feedback signal in Park vector format by a negative estimate of a transformation angle $\theta$ in Park vector format to provide a synchronous frame signal;
       a PI-regulator configured to regulate said synchronous frame signal compared to zero to provide an estimated electrical frequency; and
       an integrator configured to integrate said estimated electrical frequency so as to provide said negative estimate of said transformation angle θ to said multiplier and to provide said transformation angle θ to said controller, whereby said position estimator provides said synchronous reference frame to said controller;

a controller configured to provide a voltage command for controlling said power converter, said controller receiving said current feedback signal and a current reference in Park vector format and using said synchronous reference frame, said current feedback signal, and said current reference to produce said voltage command; and a space vector modulation module, said space vector modulation module receiving said voltage command and providing control signals to said power converter.

12. The electrical power system of claim 11 wherein said high reactance generator comprises a high reactance, permanent magnet generator designed such that the short circuit current is approximately equal to the rated current.

13. The electrical power system of claim 11 wherein said controller comprises:

a first conversion block for providing said current feedback signal in Park vector format in said synchronous reference frame;

a second conversion block for providing said current reference in Park vector format in said synchronous reference frame;

a comparator using said current feedback signal and said current reference in said synchronous reference frame to provide a command; and a PI-regulator regulating said command to produce said voltage command.

14. The electrical power system of claim 11 wherein said current reference comprises an angle component and an amplitude component.

15. The electrical power system of claim 14, further comprising:

a DC link voltage sensor for sensing a DC link voltage output of said power converter and providing a DC link voltage feed back signal;

a comparator receiving said DC link voltage feed back signal and a DC link voltage command signal, and producing a DC link voltage error signal; and a PI-regulator regulating said DC link voltage error signal to produce a DC link voltage angle component, wherein said angle component of said current reference comprises said DC link voltage angle component and whereby said controller controls said DC link voltage output of said power converter.

16. The electrical power system of claim 15 further comprising:

a current sensor disposed for sensing a DC current output of said power converter and providing a load current signal;

a feedforward function module configured to receive said load current signal and produce a feedforward angle component; and a combiner configured to combine said DC link voltage angle component and said feedforward angle component so that said angle component of said current reference comprises said feedforward angle component whereby a gain sensitivity of said angle component of said current reference is minimized.

17. The electrical power system of claim 14, further comprising:

a current sensor disposed for sensing a DC current output of said power converter and providing a load current signal; and a non-linear function generator configured to receive said load current signal and produce said amplitude component of said current reference, whereby said controller controls said DC current output of said power converter.

18. An electrical power system comprising:

an electric power source comprising a high reactance permanent magnet generator adapted for providing AC power at varying power factors;

a power converter connected to said electric power source;

a plurality of current sensors, said plurality of current sensors disposed for sensing an AC current between said electric power source and said power converter, and for providing a current feedback signal;

a position estimator receiving said current feedback signal in Park vector format and providing a synchronous reference frame, wherein said position estimator comprises:

a multiplier configured to multiply said current feedback signal in Park vector format by a negative estimate of a transformation angle e in Park vector format to provide a synchronous frame signal;

a first PI-regulator configured to regulate said synchronous frame signal compared to zero to provide an estimated electrical frequency; and an integrator configured to integrate said estimated electrical frequency so as to provide said negative estimate of said transformation angle θ to said multiplier and to output said transformation angle θ, whereby said position estimator provides said synchronous reference frame;

a DC link voltage sensor for sensing a DC link voltage output of said power converter and providing a DC link voltage feed back signal;

a first comparator receiving said DC link voltage feed back signal and a DC link voltage command signal, and producing a DC link voltage error signal;

a second PI-regulator regulating said DC link voltage error signal to produce a DC link voltage angle component, wherein a current reference comprises an angle component and an amplitude component and said angle component of said current reference comprises said DC link voltage angle component and whereby said electrical power system controls said DC link voltage output of said power converter;

a current sensor disposed for sensing a DC current output of said power converter and providing a load current signal;

a feedforward function module configured to receive said load current signal and produce a feedforward angle component;

a combiner configured to combine said DC link voltage angle component and said feedforward angle component so that said angle component of said current, reference comprises said feedforward angle component whereby a gain sensitivity of said angle component of said current reference is minimized;

a non-linear function generator configured to receive said load current signal and produce said amplitude component of said current reference, whereby said controller controls said DC current output of said power converter;

a controller configured to provide a voltage command for controlling said power converter, said controller receiving said current feedback signal and said current reference in Park vector format and using said synchronous reference frame, said current feedback signal, and said current reference to produce said voltage command, wherein said controller comprises:
- a first conversion block for providing said current feedback signal in Park vector format in said synchronous reference frame;
- a second conversion block for providing said current reference in Park vector, format in said synchronous reference frame;
- a second comparator using said current feedback signal and said current reference in said synchronous reference frame to provide a command; and
- a third PI-regulator regulating said command to produce said voltage command; and a space vector modulation module, said space vector modulation module receiving said voltage command and providing control signals to said power converter.

19. A method for electrical power generation comprising steps of:
- supplying electric power from an electric power source comprising a high reactance generator adapted for providing AC power, wherein said electric power source is connected to a power converter;
- sensing an AC current between said electric power source and said power converter using a plurality of current sensors to provide a current feedback signal;
- using said current feedback signal in Park vector format to provide a synchronous reference frame by performing steps of:
  - receiving said current feedback signal in Park vector format;
  - multiplying said current feedback signal in Park vector format by a negative estimate of a transformation angle θ in Park vector format to provide a synchronous frame signal;
  - regulating said synchronous frame signal compared to zero with a PI-regulator to provide an estimated electrical frequency; and
  - integrating said estimated electrical frequency so as to provide said negative estimate of said transformation angle θ in the above step of multiplying and to provide said transformation angle θ, whereby said synchronous reference frame is provided; and
- controlling said power converter by using said synchronous reference frame, said current feedback signal, and a current reference to produce a voltage command and feeding said voltage command through a space vector modulation module to provide control signals to said power converter.

20. The method of claim 19 wherein said controlling step further comprises:
- providing said current feedback signal in Park vector format in said synchronous reference frame;
- providing said current reference in Park vector format in said synchronous reference frame;
- comparing said current feedback signal and said current reference in said synchronous reference frame to provide a command; and
- regulating said command using a PI-regulator to produce said voltage command.

21. The method of claim 19 wherein said current reference comprises an angle component and an amplitude component.

22. The method of claim 21, further comprising steps of:
- sensing a DC link voltage output of said power converter and providing a DC link voltage feed back signal;
- comparing said DC link voltage feed back signal and a DC link voltage command signal to produce a DC link voltage error signal; and
- regulating said DC link voltage error signal using a PI-regulator to produce a DC link voltage angle component, wherein said angle component of said current reference comprises said DC link voltage angle component and whereby said DC link voltage output of said power converter is controlled.

23. The method of claim 22 further comprising steps of:
- sensing a DC current output of said power converter and providing a load current signal;
- using said load current signal to produce a feedforward angle component; and
- combining said DC link voltage angle component and said feedforward angle component so that said angle component of said current reference comprises said feedforward angle component whereby a gain sensitivity of said angle component of said current reference is minimized.

24. The method of claim 21, further comprising steps of:
- sensing a DC current output of said power converter and providing a load current signal; and
- generating a non-linear function of said load current signal to produce said amplitude component of said current reference, whereby said DC current output of said power converter is controlled.

* * * * *